United States Patent [19]

Eickmann

[11] 3,823,898

[45] July 16, 1974

[54] HYDRAULICALLY CONTROLLED FLUIDSTREAM-DRIVEN AIRCRAFT

[76] Inventor: Karl Eickmann, 2420 Isshiki, Hayama-machi, Japan

[22] Filed: Mar. 8, 1971

[21] Appl. No.: 104,676

Related U.S. Application Data

[63] Continuation-in-part of Ser. No. 782,349, Dec. 9, 1968, abandoned, which is a continuation-in-part of Ser. No. 551,023, May 18, 1966, abandoned, which is a continuation-in-part of Ser. No. 328,395, Dec. 5, 1963, Pat. No. 3,220,898.

[52] U.S. Cl. .................... 244/55, 244/12 R, 244/60, 244/73 R

[51] Int. Cl. .................... B64d 27/02

[58] Field of Search ............ 244/12 R, 53 R, 55, 62, 244/63, 65, 73 R, 17.23, 60

[56] References Cited

UNITED STATES PATENTS

| | | | |
|---|---|---|---|
| 984,269 | 2/1911 | Friedel | 244/53 R X |
| 1,827,438 | 10/1931 | Rauch | 244/53 R |
| 1,939,156 | 12/1933 | Wright | 244/53 R |
| 2,212,490 | 8/1940 | Adler | 244/53 R |
| 2,454,138 | 11/1948 | Delzer | 244/60 X |
| 2,514,822 | 7/1950 | Wolfe | 244/17.23 X |

*Primary Examiner*—Duane A. Reger
*Assistant Examiner*—Barry L. Kelmachter
*Attorney, Agent, or Firm*—Michael S. Striker

[57] ABSTRACT

In an aircraft a fluid handling device having a plurality of separated fluid handling working chamber groups with separated fluid outlets of each of said working chamber groups. Each fluid handling working chamber group has a plurality of individual fluid-handling spaces which together deliver the discharged fluid into the common fluid outlet of the respective working chamber group. Each working chamber group has an actuator means for actuating the respective displacement means, which move the working fluid into and out of the respective individual fluid handling spaces.

Each fluid outlet of each working chamber group is connected by a respective uninterrupted fluid line directly to an associated fluid motor for revolving the same, while at least one propeller is associated with each respective fluidmotor to be driven by the same. The actuator means of more than one working chamber group are connected together for assuring equal or at least at all times proportionate actuation of the displacement means of the plurality of the working chamber groups. Thus equal or at least at all times proportionate rate of flow are forced out of the said separated fluid outlets through said fluidlines for forcing the said fluidmotors to revolve with equal or at least at all times proportionate rotary velocity of said fluid motors and propellers, whereby fluidstreams of equal or at least at all times proportionate thrust are generated and applied in substantial symmetric locations on the body of the craft to drive the same steadily in the desired direction.

21 Claims, 15 Drawing Figures

INVENTOR.
KARL EICKMANN

INVENTOR.
KARL EICKMANN

INVENTOR.
KARL EICKMANN

INVENTOR.
KARL EICKMANN

Fig. 9-A
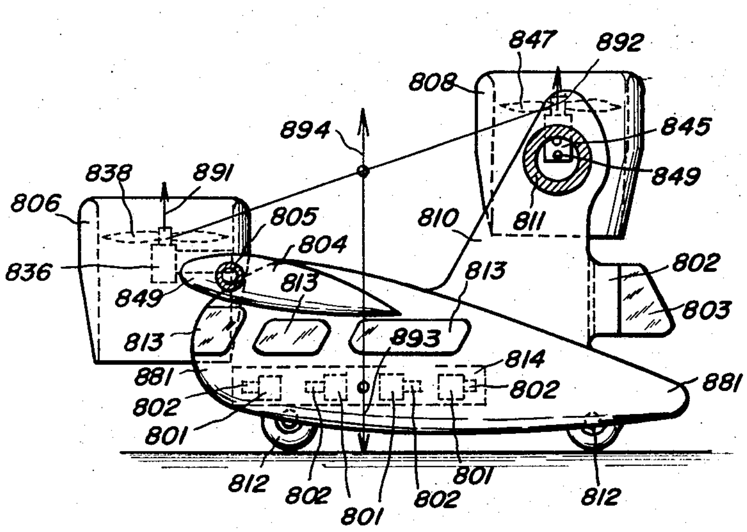
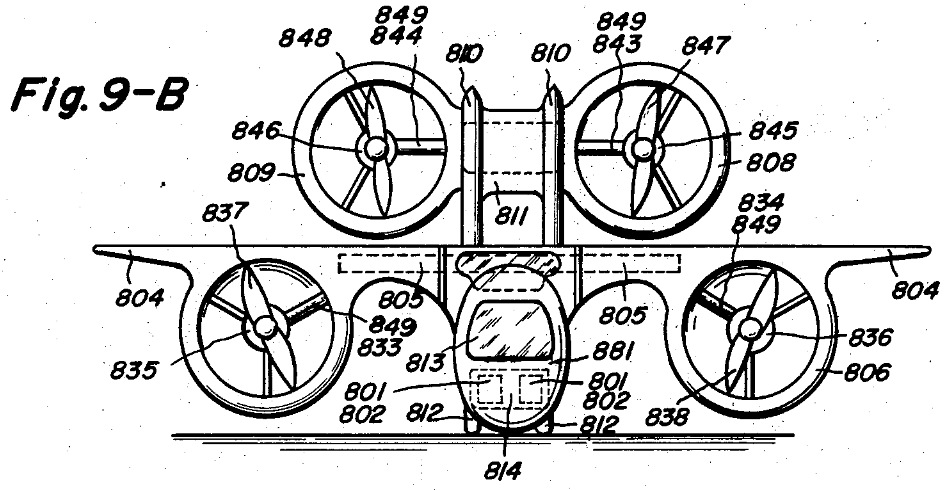
Fig. 10
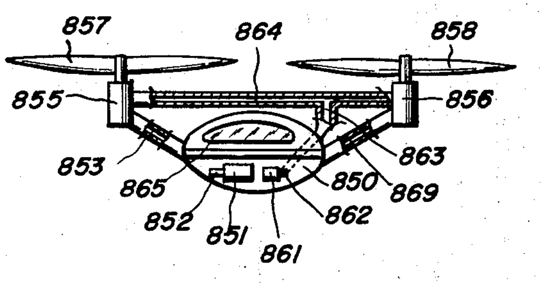
INVENTOR.
KARL EICKMANN
BY

PATENTED JUL 16 1974

3,823,898

INVENTOR.
KARL EICKMANN
BY [signature]

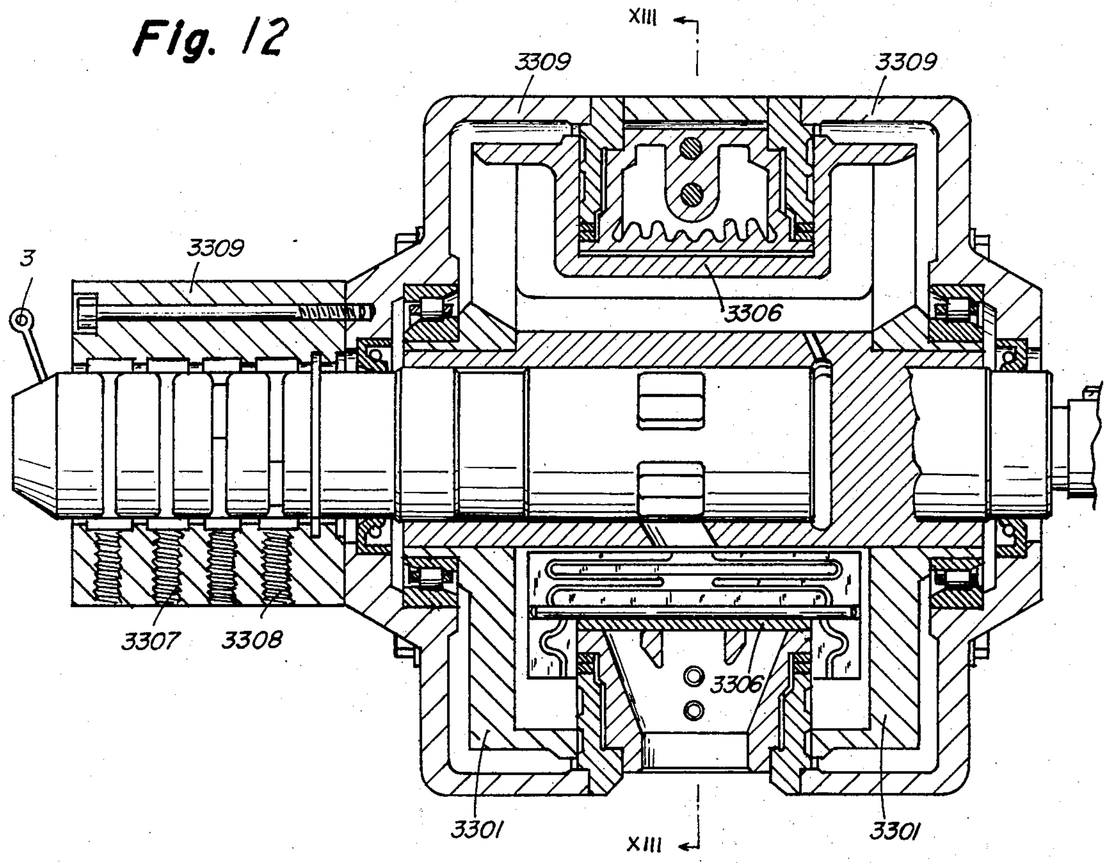
XIII
3309
3309
3
3309
3306
3307
3308
3306
3301
3301
XIII
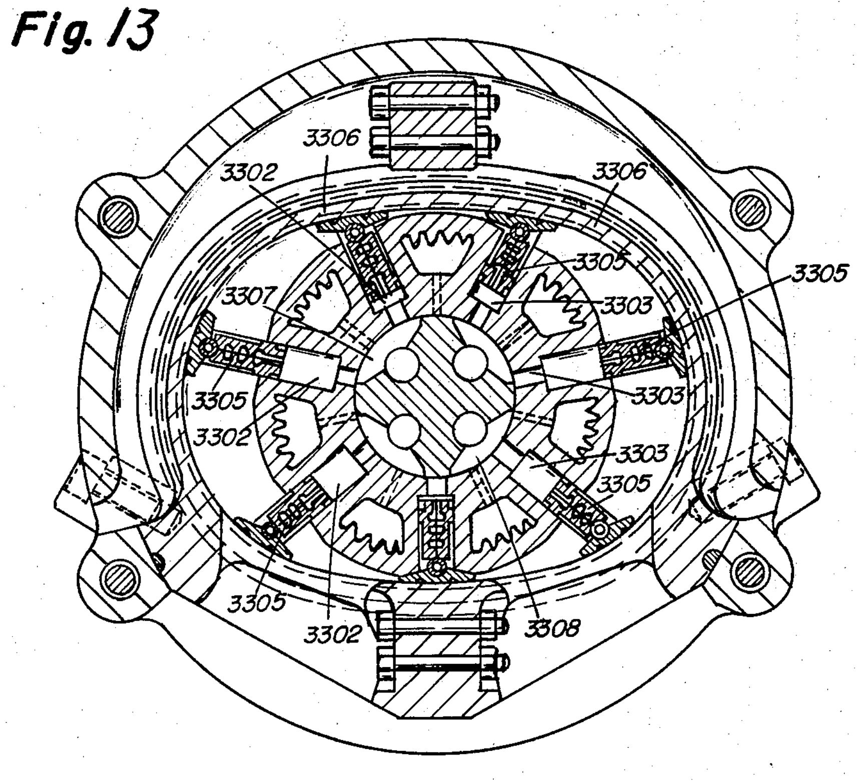
3306
3302
3306
3305
3305
3307
3303
3305
3303
3302
3303
3305
3305
3302
3308

HYDRAULICALLY CONTROLLED FLUIDSTREAM-DRIVEN AIRCRAFT

REFERENCE TO RELATED APPLICATION

This is a continuation in part of my co-pending U.S. Pat. application Ser. No. 782,349 of Dec. 9, 1968, now abandoned, which is a continuation of my earlier U.S. Pat. application Ser. No. 551,023 of May 18, 1966, now abandoned and which was a continuation in part of my earlier U.S. Pat. application Ser. No. 328,395 of Dec. 5, 1963 now U.S. Pat. No. 3,220,898, while a part thereof is now U.S. Pat. No. 3,497,162.

BACKGROUND OF THE INVENTION

Hydraulically driven aircraft have already been proposed in the past. But they have employed either only a single working chamber group in the fluid-handling device and split a plurality of flows out thereof, whereby the control over the synchronization of the rotary velocity of the individual propellers was lost, or they employed control communications between fluidlines, which interrupted the equalness of rate of flow of fluid to the fluidlines. Thereby, in the hydrostatically operated propeller driven crafts of the past the control of the craft was unstable, resulting therein, that those vehicles could not effectively be used. Those drawbacks are overcome by the present invention.

SUMMARY OF THE INVENTION

It is disclosed in accordance with my present invention, that the fluid flow transmission means of separated flows of fluid of proportionate rate of flow for driving positive displacement fluid motors for revolving rotary propellers, which create flows of fluid of proportionate propulsion-or reaction force can be so improved or simplified, that they can be utilized for driving aircrafts and to provide the stability of straight or curved, substantial horizontal motion of the aircraft which will be inexpensive, because the novel driving system is inexpensive.

It is therefore an object of this invention to provide an inexpensive and simple hydrostatically controlled fluidstream driven aircraft.

Another object of the invention is to control the straightness of forward movement of an aircraft by governing the proportionateness of powers, forces, directions and/or rates of flow of a plurality.

A further object of the invention is, to provide means for driving a fluidstream driven aircraft in curves.

A fluid stream driven aircraft according to a preferred embodiment of the invention comprises a body having an axis of substantial symmetry; at least one pair of hydraulic fluid operated motors on the body; a pair of fluid stream creating means, such as propellers, driven by the motors, respectively, and arranged symmetrically on opposite sides of the axis; at least one hydraulic fluid flow producing means such as a multiple flow pump, having at least a pair of separate fluid handling chambers connected to separate outlets, the pump including means for fluid-tight separation of the chambers and outlets, as described in my U.S. Pat. No. 3,220,898, in detail; a pair of displacement means associated with the fluid handling chambers, respectively common actuator means, such as an adjustable eccentric actuator ring, cooperating with the two separate displacement means for maintaining equal movements of the same so that fluid flows in said outlets at proportioned and equal flow rates; and a pair of outlet passage means conneting the outlets with the motors, respectively, whereby the air stream creating propellers on opposite sides of said axis are driven at equal velocities for producing equal thrusts on both sides of the axis for stabilizing the movement and attitude of the aircraft.

Other features and objects of the invention or embodiments or modifications thereof will become apparent from the accompanying drawings.

BRIEF DESCRIPTION OF THE DRAWINGS

FIG. 1 of this present patent application is the same as FIG. 151 of the parental patent application Ser. No. 328,395.

FIG. 3 shows the vehicle in horizontal flight while FIG. 4 shows the vehicle in vertical position.

FIG. 9 shows in its upper part FIG. 9 A a sidewards view upon another hydraulically controlled fluid driven vehicle which is able to start vertically and to land vertically and which is also able to fly or to roll or to slide horizontally and whereof FIG. 16 B represents a view upon the vehicle of FIG. 16 A from the front.

FIG. 10 shows a sidewards view and partially sectional views into another embodiment of a hydraulically controlled fluid driven vehicle of this invention wherein additional control flow is passed into a medial fluid line between a rotary member pair.

FIG. 12 is a longitudinal sectional view illustrating an embodiment of a double flow pump for producing two separate flows of fluid at equal rates of flow, FIG. 12 corresponding to FIG. 61 of my U.S. Pat. No. 3,320,898.

FIG. 13 is a cross sectional view taken on line XIII—XIII in FIG. 12, and corresponding to FIG. 62 of my U.S. Pat. No. 3,320,898.

In all embodiments of the invention, a double flow fluid supply device, such as a double flow pump of the type shown in FIGS. 12, 13 and 14, is used. FIGS. 12 and 13, and FIG. 16 illustrate different embodiments serving the same purpose, and will be together described with particular reference to FIG. 14.

Figure 14:
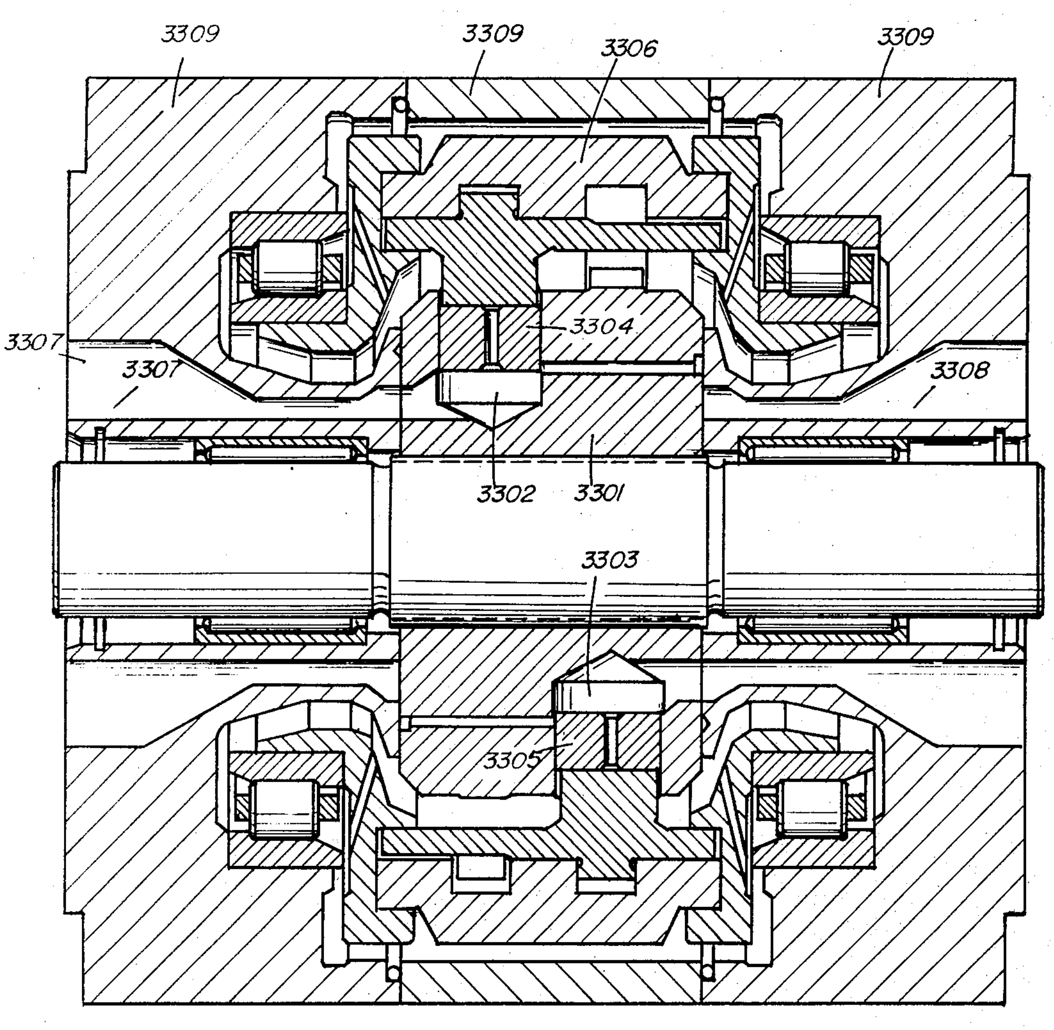
FIG. 14 is a longitudinal sectional view illustrating another embodiment of a pump having two separate flows of equal rate, and corresponding to FIG. 2 of my U.S. Pat. No. 3,683,751.

In the fluid flow supply device, or pump, of FIG. 14 and FIGS. 12, 13, a rotor 3301 is rotatably mounted in a housing 3309. Inlet passages 3307 and 3308 extend through a corresponding housing end portion to corresponding stationary control faces on the respective housing portions, where they form inlet control ports, and corresponding outlet passages 3307*a* and 3308*a* are provided. The rotor 3301 contains two separate groups of fluid handling working chambers 3302 and 3303 which are separated from each other by the walls of the rotor, and have no communication whatsoever. The complete fluid-tight separation of two groups of working chambers 3302 and 3303 from each other has the important result that at the two outlets, separate flows of fluid having an equal and proportionate rate of flow are produced. Displacement means, for example piston 3304 or 3305, are associated with each fluid handling working chamber 3302 or 3303. Each working chamber group contains a number of working chambers which may be cylinders in the embodiment of FIG. 14 and vane slots in the embodiment of FIGS. 12 and 13. The number of working chambers may be five or nine. About half of the working chambers of each working chamber group communicates with the inlet port, and an equal number communicate with the outlet port at the respective moment. During the revolution of rotor 3301, each working chamber communicates for a time with the inlet port and during another time with the outlet port. The outlet control ports are also fluid-tightly separate from the inlet control ports. Consequently, expanding fluid receiving chambers of each working chamber group 3302 and 3303 form separate inlet spaces together with their respective inlet port, while the respective contracting and fluid expelling chambers of the separated working chamber groups 3302 and 3303 form separate outlet spaces together with their respective outlet port.

The displacement means, for example the pistons or vanes 3304 and 3305, are connected to slide shoes which slide along the inner circular surface of an actuator ring means 3306 common to both groups of pistons. The common actuator means is eccentric to the axis of the rotor 3301, and can be adjusted to vary the eccentricity of its center in relation to the axis of the rotor for varying the delivery stroke of the pistons for the discharge of fluid out of the working chambers 3302 and 3303, simultaneously in both groups of chambers. That means that if the common actuator means 3306 causes a piston 3304 of the working chamber group 3302 to perform a stroke of a certain length, the same stroke will be carried out by the respective piston 3305 of the working chamber group 3303.

Thus, if fluid is expelled from the working chamber group 3302 at a given time at a certain rate of flow, then the fluid will be expelled from the other working chamber group 3303 at the same rate of flow. The cylinders and pistons, or vane slots and vanes, in both working chamber groups have the same dimensions, and are fitted with the same clearances, and are also of the same material as both separate working chamber groups 3302 and 3303. Working chambers 3302 supply the flow of fluid into separate fluid ports 3307, and the working chambers 3303 supply the flow of fluid into the other separate fluid port 3308.

Figure 1:
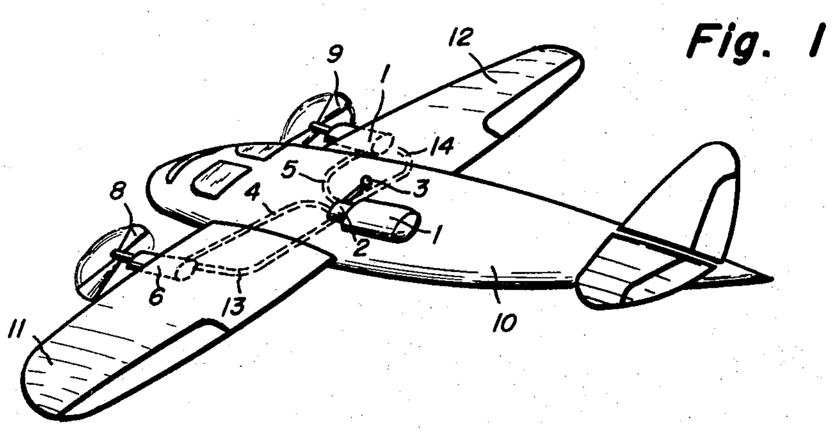
FIG. 1 is a view on a hydraulically controlled fluidstream driven aircraft which is one embodiment of the invention.

FIG. 1 illustrates an embodiment of a hydraulically controlled fluid stream driven aircraft which is inexpensively built, handles easily, and is very safe in operation. A body 10 of the aircraft carries a pair of wings 11 and 12, and a fluid flow producing means is mounted on the body 10 and includes a power plant or prime mover 1, and a multiple flow variable pump of the type described with reference to FIG. 14. The rotor of pump 2 is driven by the prime mover 1, and produces at least two separate flows out of the outlet 3307 and 3308 shown in FIGS. 12 to 14. Adjusting means 3 is provided for adjusting the eccentric position of the actuator ring means 3306 so that the two flows of fluid out of said two outles 3307 and 3308 are increased or reduced, while remaining equal at all times. The flows of fluid may be varied simultaneously between a zero flow rate, and the maximum flow rate.

The fluid flow outlet passage 4 leads one flow of fluid which is produced in fluid flow producing means 2 to positive displacement fluid motors 6 and revolves the rotor parts therein, whereby the thereto connected rotary air stream creating member or propeller 8 is revolved. The revolution of the rotary member 8 creates a stream of flow of fluid especially of air in a preferred backwards direction relative to the body 10 of the aircraft. Fluid line 13 returns a flow of fluid back from positive displacement fluid motor 6 into the inlets of multiple fluid flow producing pump means 2. The other flow of fluid which is produced in fluid flow producing means 2 is led through fluid flow outlet passage 5 into and through positive displacement fluid motor 7 whereby the rotor parts of positive displacement fluid motor 7 are revolved and thereby also rotary air stream creating member 9 whichis connected to the rotary parts of fluid motors 7 is revolved. The revolution of rotary member or propeller 9 creates a stream of air which is preferred to flow backwards relative to the vehicle. The return fluid flows through return flow line 14 back into fluid flow producing means 2.

The characteristic of this embodiment is that the rate of flow of both flows of fluid 4 and 5 is proportionate and equal at any time during the operation of the vehicle. The proportionateness between these two flows of fluid 4 and 5 will never be varied and the rate of flow in both of them will be definitely and surely controlled by the fluid flow adjustment means 3. If fluid flow adjustment means 3 sets the rate of flow to zero then the rate of flow in both flows of fluid 4 and 5 will be zero.

A fluid stream driven aircraft as illustrated in FIGS. 1 and 14, comprises at least one pair of hydraulic fluid operated motors 6, 7 mounted on the body 10 symmetrically on opposite sides of an axis of symmetry; a pair of air stream creating means, namely propellers 8 and 9, driven by the motors 6, 7, respectively, and arranged symmetrically on opposite sides of the axis; at least one hydraulic fluid flow producing means, for example the double flow pump shown in FIG. 14, having at least a pair of separate fluid handling chambers 3302, 3303 connected to separate outlets 3307, 3308, and including means 3301, 3309 for fluid-tight separation of the chambers and outlets 3302, 3307 and 3303, 3308; a pair of displacement means, for example the pistons 3304, 3305, associated with the fluid handling chambers 3302, 3303, respectively; common actuator means in the form of a ring 3306 eccentric to the axis of rotor 3301, cooperating with the two displacement means or pistons 3304, 3305 for maintaining equal movements of the two displacement means so that fluid flows in the outlets 3307 and 3308 at proportionate and equal flow rates; and a pair of delivery passages 4, 5, see FIG. 1, connecting the outlets 3307, 3308 with the motors 6 and 7, respectively.

In this manner, the air stream creating means or propellers 8, 9 are driven at equal velocities for producing equal thrusts on both sides of the axis for stabilizing movement and attitude of the aircraft.

The adjusting means 3 are connected with the common actuator means 3306 for varying the eccentricity of the inner circular surface thereof so that both displacement means or pistons 3304, 3305 are simultaneously and equally adjusted to vary the equal flow rate in the outlets 3307 and 3308 which communicate with the delivering passages 4 and 5 connecting the outlets with the hydraulic motors 6 and 7.

If the fluid flow adjustment means 3 sets the rate of flow to maximum capacity of fluid flow producing means 2 then in both flows 4 and 5 the rate of flow of fluid will be the maximum possible and thereby the proportionateness of the rate of flow of fluid between both flows will again be maintained. It is possible and necessary that the fluid flow producing means 2 has a control means 3 whereby the rate of flow can be controlled from zero to maximum and vice versa. It would also be possible to set a constant fluid flow producing means which has no fluid flow adjustment means 3 but in such a case the rotary velocity of the rotary members 8 and 9 would no more be controlled by the adjustment means 3 but by the rotary velocity of the fluid flow producing means 2 or of the power plant 1. It is therefore preferred to use a variable fluid flow producing means which is provided with a fluid flow adjustment means 3. Under such circumstances the rotary velocity of the power plant 1 and thereby of the thereto connected fluid flow producing means 2 can be set and fixed into the most economical condition orderly before the aircraft starts. The fluid flow adjustment means 3 will then set the delivery of flow of the fluid flow producing means 2 to zero and both rotary members or propellers 8 and 9 will then stand still. For the purpose for starting the aircraft the fluid flow adjustment means 3 will gradually adjust the delivered quantity of the fluid flow producing means and thereby the rate of flow in the fluid lines 4 and 5 in the same proportion gradually from zero to a high rate of flow capacity. Thereby in the positive displacement fluid motors 6 and 7 and the rotary velocity of the rotary members or propellers 8 or 9 will gradually increase to a great velocity and a pair of fluid streams will be created by rotary members 8 and 9. This pair of fluid streams will be of equal rate of flow during all times of operation.

It is preferred to make the rotary members 8, 9 in size and in rotary velocity equal. Thereby it is assured that the fluid streams created by the rotary members 8 and 9 will be equal and they should be equally distanced and diametrically located to body 10 or its axis. Then the two fluid streams will have equal power and equal reaction forces and thereby equal thrusts in order to move the vehicle forward. If the proportionateness of the power, thrust and speed and size of the fluid streams created by rotary members 8 and 9 is proportionate or equal then the stability of the vehicle 10 in the air is at all times maintained. It is therefore the special characteristic and feature of the embodiment of FIG. 1 that the stability of this aircraft is everytime maintained by means of the hydraulically controlled fluidstream drive of which assures the proportionateness and equality of the pair of flows of fluid. It is the proportionateness of the rate of flows and the equality of the sizes of the symmetrically arranged propellers and of the thereby created thrusts that the stability of the vehicle of FIG. 1 in the air is every time assured and maintained. It is no more necessary in accordance with this embodiment of the invention to control the motors 6 and 7 individually as it was custom heretofore in heretofore fluidstream driven vehicles. The control of the vehicle is therefore not only stabilized because it is not possible that the thrust of one fluid stream changes relatively to the other but it is also very much simplified to operate this vehicle because operation by a multiplicity of control means is not necessary but can be done by one control means only. This one control means is a fluid flow adjustment means 3 which governs the rate of flow of fluid in both fluid lines 4 and 5 and governs it so effectively that the proportionateness of rate of flow is maintained in both fluid lines also if the rate of flow is varies. It is thereby possible in accordance with FIG. 1 of this invention to build aircraft and to make them very safe in operation and to make its control so simple that the work of the pilot or of the driver of the vehicle is very much reduced and that his attention can be much more directed to the actual flight than this was possible in heretofore used conventional vehicles.

Figure 2:
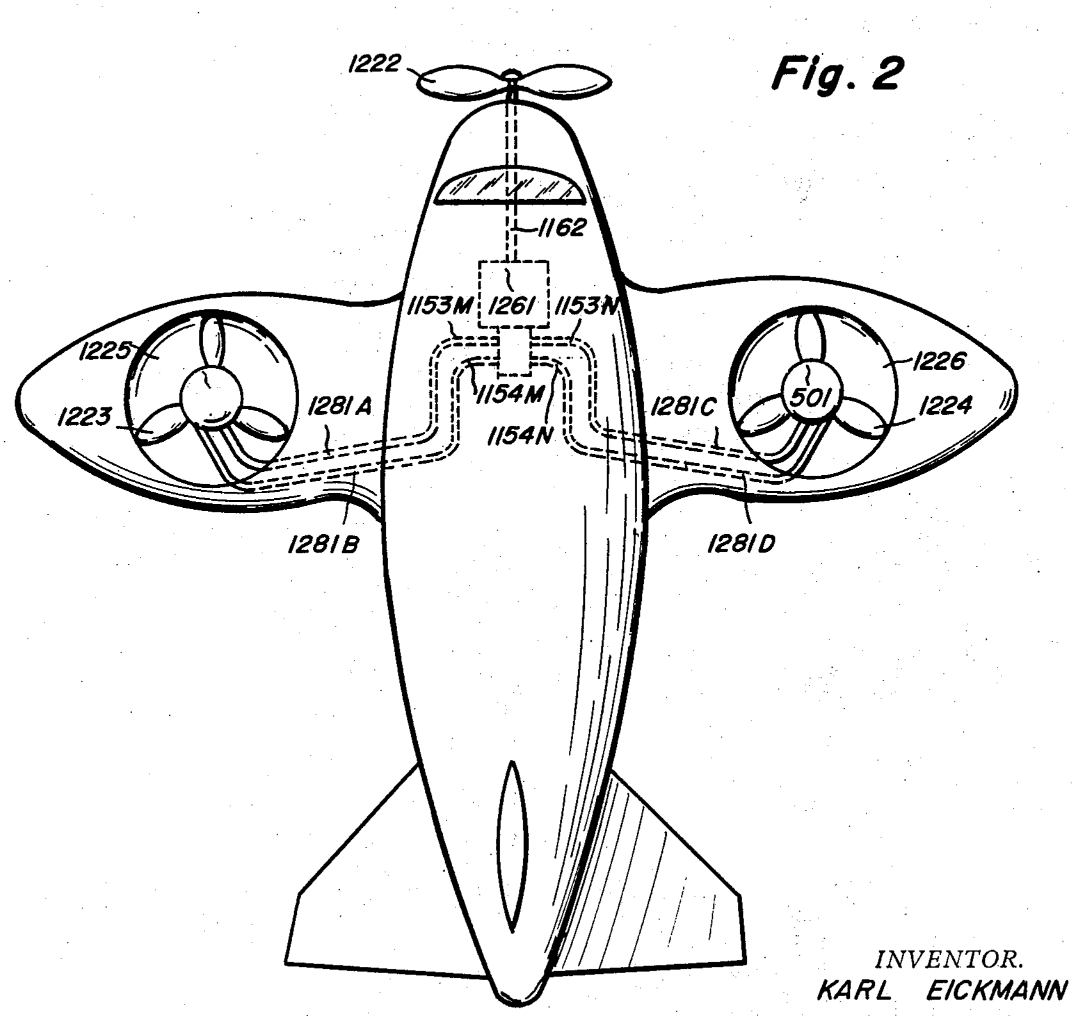
FIG. 2 is a view from above on a hydraulically controlled fluid driven aircraft of another embodiment of the invention which is also the figure which was already present in my parental patent application Ser. No. 328,395 of Dec. 5, 1963, now U.S. Pat. No. 3,220,848 whereof this patent specification is a continuation-in-part.

In the embodiment of FIG. 2 a vehicle is shown which is vertically borne by fluid motors 501. Fluid motors 501 are revolving rotary members 1223 and 1224. The rotary velocity of the rotary members 1223 and 1224 is assured by revolving the rotary parts of the motors 501. Motors 501 are therefore fluid motors and they are driven by flows of fluid. The flows of fluid are created in a fluid flow producing means 1261. Fluid flow producing means 1261 creates or actuates two flows of fluid of equal rate of flow which are cited by fluid lines and which are passed through fluid lines 1281A and 1281C. Both fluid streams enter each one of the fluid motors 501 and revolve the rotary parts of the same whereby the rotary members 1223 and 1224 are definitely revolved with definitely equal rotary annular velocities. The return of the fluidflows is done through fluidlines 1281B and 1281D. The fluidborne vehicle may be propelled forwards by by rotary member 1222 which may also be actuated by a power plant 1261. The rotary members 1223 and 1224 may be supplied in ducts or wings 1225 and 1226 in order to increase the lifting capacity and in order to prevent resistance during the horizontal flight of the vehicle. The vehicle of FIG. 2 is due to the maintained proportionateness of flow in the fluid lines 1281A and 1281C also surely controlled during its flight. The stability of locations and action of the vehicle is at all times maintained thereby so that the rotary velocity of the rotary members which are creating fluid streams 1223 and 1224 are at all times during operation maintained. The maintaining is assured thereby that the fluid flow producing means 1261 creates two flows of equal rate of flow which are separated from each other and which are never communicating with each other so that the separatedness and the rate of flow of fluid in both fluid lines 1253, 1153 and/or in fluid passages 1281A and 1281C is at all times maintained and assured so that the porportionatness of all movements of the different flows of fluid as well as of the rotary members 1223 and 1224 and of the motors 501 and thereby of the whole driving system including the fluid streams is assured and maintained.

Figure 3:
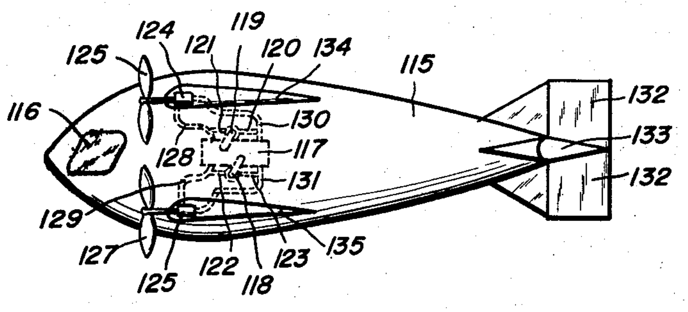
FIGS. 3 and 4 are demonstrating another hydraulically controlled fluidstream driven vehicle of this invention which is preferred to be an aircraft which is able to start vertically and also able to move horizontally.
Figure 4:
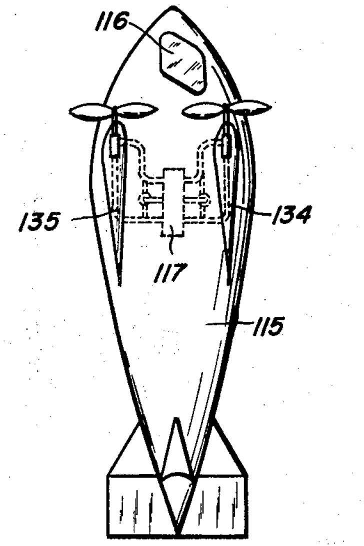

In FIGS. 3 and 4 again a hydraulically controlled fluid stream driven vehicle of this invention is illustrated. FIG. 3 shows the vehicle in horizontal position or in horizontal movement while FIG. 4 illustrates the vehicle in vertical position or in vertical movement. The vehicle may consist of a body 115 having a cabin 116 and control levels 132 and 133. Attached to the vehicle or born therein is a fluid flow producing means 117 which may include a power plant. The characteristic according to this invention of fluid flow producing means 117 is that a plurality of flow of fluid of equal rate of flow is produced thereby. The plurality of flows of fluid are separated from each other and are not communicating with each other. One of the flows of fluid is led from the fluid flow producing means 117 through fluid flow passage 128 into positive displacement fluidmotor 124 and the other flow of fluid is led from fluid flow producing means 117 through fluid flow passage 129 into positive displacement fluid motor 125. The said flows of fluid which are flowing into the respective positive displacement fluid motors 124 or 125 are revolving the rotary part thereof.

Rotary members like propellers 126 or 127 are connected to the rotary parts of the fluid motors 124 or 125. Since it is a characteristic of fluid flow producing means 117 to create a plurality of flows which are separated from each other and wherein the rate of flow is during all times of operation maintained in proportionateness it is also assured thereby that the rotary parts and the rotary members of fluid motors 124 and 125 and thereby of the rotary members 126 and 127 is at all times assured. The rotary members 126 and 127 are creating therefore streams of flow of equal rate of flow and these streams of flow are creating a thrust on the vehicle. This thrust is able to move the vehicle forward or to move it upwards or downwards. The specialty of this invention contained in these figures is, that the rate of flow in the streams of flow which are created and thereby the forces or the thrusts of fluidstreams which are actuated by the hydraulically driving means of these vehicles are remaining proportionate to each other during all time of operation. This provides the stability of the location or movement or rest of the vehicle in fluid. This is also maintained thereby that the rotary members which are creating the fluid streams are located diametrically or oppositionally relative to the axis of the body 115 of the vehicle. It is therefore possible to provide for example for or another quantity of rotary members 126 or 127 or pairs thereof in order to always maintain the proportionateness of pairs of streams of fluid. The diametrically or oppositional location of the axis of the pairs of fluidstreams in combination with the resistance of the vehicle itself during its movement through fluid the stability of location and of movement of the vehicle through fluid is assured. In combination with the proportionateness of the thrust of the fluid stream pairs it is in accordance with this invention necessary to provide the proportionality of the flows of the rate of flow in the separated flows of this invention which are driving and revolving the rotary members which create the fluid stream pairs.

As a specialty of this invention a by-pass means 119 between fluid line 128 and return fluid lines 130 is provided. It is also in accordance with this invention a by-pass means 118 provided between the delivery fluid line 129 and return fluidline 131. The connection between said fluid lines and the by-pass means is made by fluidlines 121 and 120 or by fluid lines 122 and 123. If the by-pass means 118 and 119 are closed, then the proportionateness of flow of fluid in the fluid lines 128, 129 is maintained. in order however to change the vehicles movement or position in the air i. e. to change it from vertically to horizontally or vice versa it is desired that sometimes one of the rotary members 126 or 127 or pairs of them are revolving with a little bit less rotary angular velocity than the other one. For this purpose the interfluidline 121 communicates fluid line 129 with by-pass means 119. It is a characteristic of this invention that the cross sectional area through interfluidline 121 is very little so that only a very little percentage of the main flow 128 can flow through interfluidline 121. By-pass means 119 is perferred to be variable from a minimum to a maximum. From by-pass means 119 said proportional flow which is allowed to flow through by pass means 119 may pass through interfluidline 120 into the return fluid line 130. Thereby it is possible if by-pass means 119 is opened that a certain quantity of fluid can flow out from fluidline 128 through by-pass means 119 via interfluidlines 121 and 120 into return fluid line 130. Thereby the rotary angular velocity of the rotary parts of fluidmotor 124 is a little bit reduced. This results in the reduction of the rotary velocity of rotary member 126 and thereby in the reduction of the fluidstream created by rotary member 126. If the by-pass means 118 is opened then a little portion of the flow of fluid through fluid line 129 can flow through the interfluid line 122 and by-pass means 118 and interfluidline 123 into the return fluid line 131.

Thereby the rotary angular velocity of the rotary parts of fluid motor 125 becomes a little bit reduced and a little reduction of the rotary velocity of rotary member 127 is thereby accompanied. Consequently the thrust in the fluid streams created by rotary member 127 is little bit reduced. The flow of fluid through the intermediate fluid lines 121, 120 or 122 or 123 is actuated by the difference in fluid pressure in the delivery fluid lines 128 or 129 and the return fluid lines 130 and 131. If according to the figures the described thrust in one or in a pair of fluid streams or in a plurality thereof is little bit reduced relatively to the other one then the position of the vehicle tilts. I.e. if leftwards and rightwards of the body of FIG. 3 each rotary member 126 and each rotary member 127 is provided so that the vehicle has a pair of rotary members 126 and another pair of rotary members 127 and each member of the pair of members is oppositionally located to the vehicles body and distanced therefrom equally and the sizes of the rotary members are equal and the rotary velocities of the rotary members are equal then the opening of one or the other of the by-pass means 118 or 119 will result in a tilting of the vehicle from horizontal to vertically or vice versa. The opening of the by-pass means 118 would then result in a little less rotary velocity in rotary members 127 and this would consequently result in the tilting of the vehicle from the vertical position of FIG. 4 into a horizontal position of FIG. 3. On contrary the opening of the by-pass means 119 would result in the tilting of the vehicle from the horizontal position of FIG. 3 into the vertical position of FIG. 4. Consequently while the timewise opening or closing of the by-pass means 118 or 119 the vehicle can be changed from vertical to horizontally and it can be led into any position therebetween. In the case of closing of both by-pass means, the vehicle will either fly straight vertically or straight horizontally or in an inclination or between.

The vehicle may therefore either be borne by the rotary members 126 during vertical flight or it may be borne by wings 134 and 135 during a horizontal or inclined flight or it may be borne by both of said means during an inclined flight. It is necessary in accordance with this invention that the square section through fluid lines 121 is very small compared to the square section of the other fluid lines 128, 129, 130 and 131 in order to assure that only a very little percentage of the main flows can flow through the by-pass means 119 or 118. This function can also be managed by the by-pass means 118 and 119. Further it is necessary in accordance with this invention that the rate of flow of fluid in all delivery passages remains equal under all circumstances and that the flows of fluid of delivery remain separated from each other under all circumstances. It is preferred that the rates of flow of fluid in the delivery fluid passages is set and maintained equally by the fluid flow producing means 117 and that also the sizes of the rotary members or fluid motors should be sized equally in order to get a most simple vehicle.

Figure 6:
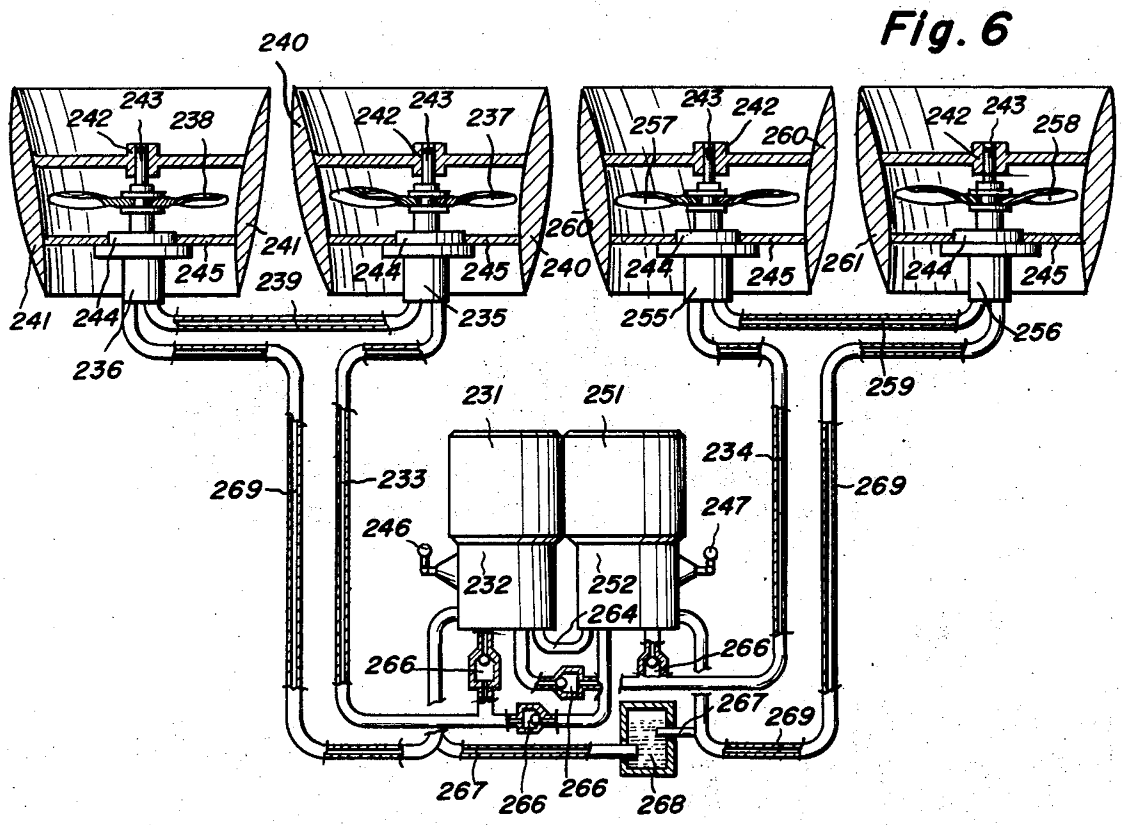
FIG. 6 is a partially sectional view through a power supply unit utilizing a multistream drive which constitutes another embodiment of the invention.

In FIG. 6 a separated hydrostatical power supply means is shown which can be separatedly transported and which can be fixed onto any suitable kind of vehicle. For this purpose power plant and fluid flow producing means 1 is provided and connected to the delivery fluid lines 4 and 5. Delivery fluid lines 4 and 5 are connected to the rotary parts in fluid motors, especially positive displacement fluid motors 6 and 7. Rotary members 8 or 9 or propellers 8 or 9 are connected to the rotary parts of fluid motors 6 or 7. Return fluid lines 13 and 14 are returning from the fluid motors 6 or 7 directly or indirectly to the fluid flow producing means 1. Fluid flow producing means 1 may take its fluid out of tank 15 through two lines 16.

Fluid flow producing means 1 should be provided or is preferrably provided with a fluid flow adjustment means 3. Fluid flow adjustment means 3 is able to control the displacement volume of the displacement chambers in fluid flow producing means 1 proportionately to each other if they change their volume. The control adjustment means 3 therefore assures that at all times at least a plurality of flows, like a pair of flows of equal rate of flow or of proportional rate of flow, are led out of fluid flow producing means 1 separatedly into the separated fluid lines 4 and 5. Thereby the proportionateness of the rotary angular velocity of rotary members 8 and 9 is assured at all times. By-pass means 17 and 19 may be set between the delivery fluid lines 4 and 5 and the respective return fluid line 13 or 14. Interfluidlines 17 or 20 may enable the flow of a small fraction of fluid which flows through the delivery fluid lines 4 or 5 into the return fluid lines 13 or 14. The by-pass means 18 or 20 may be operated either separatedly from each other or they may be operated combined by a combined operation means 23 which is connected by connection means 21 and 22 to the by-pass means 18 and 20. By using the combined handle 23 for controlling both by-pass means it is possible by a single handle to change the rotary velocity of the rotary members 8 and 9 relative to each other in a vice versa way and it is thereby possible by only one handle to change the thrust of the fluid streams produced by rotary members 8 and 9 relatively to each other to any desired extent. The pair of fluid streams which are actuated by rotary members 8 and 9 provide a respective thrust which can be pairs of thrust forces which can be utilized to propel a vehicle or to drive a vehicle. The change of the thrusts in these fluid streams relative to each other by the one combined vehicle 23 makes it possible to change the direction or location of the vehicle.

Figure 5:
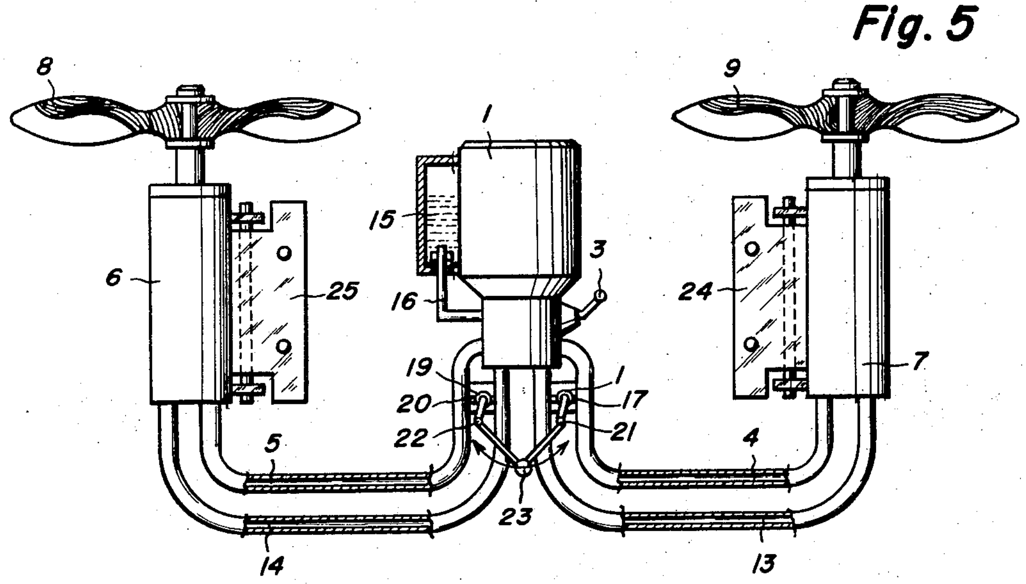
FIG. 5 is a hydrostatical power supply set which constitutes another embodiment of this invention and which can be attached to any suitable kind of vehicles.

The hydrostatical power supply unit of FIG. 5 which is more definitely described as a hydraulically controlled fluid stream unit may be transportable and may be fixed to any kind of vehicle by the adapting means 24 and 25. It is preferred to set the power plant 1 somewhere into or onto the body of the vehicle and to set the rotary members 8 and 9 by means of fixing the bearing means 24 and 25 onto the vehicle in oppositional direction to the vehicle's body. By fixing the hydraulically controlled fluid stream drive means of FIG. 5 onto a vehicle it is possible to drive the respective vehicle straightly forwards or straightly vertically or straightly horizontally or to change it leftwards or rightwards or to incline it or even to turn it completely around on a point by means of the separateness of the flows of fluid through fluid passages 4 and 5 or by means of exercising the by-pass means 18 or 20 or both together by the combined control means 23. It would be suitable to fix the hydrostatically controlled fluid stream drive means of FIG. 5 to boats, to land vehicles, to cars, to trucks, to sleds, to aircrafts, to air cushion vehicles, or any other kinds of vehicles which are moving through fluid so that the rotary members 8 and 9 can produce a stream of fluid or streams of fluid for driving the vehicle. It should be possible to connect the fluidmotors 6 or 7 to the fastening or bearing means 25 or 24 in such a way that the fluidmotors can be swung into the vehicle or out of the vehicle by means of a pivoting means connected between fastening or bearing means 25 or 24 or fluid motors 6 or 7.

In FIG. 6, a hydraulically controlled fluid stream drive means is provided which can be fixed to vehicles or which can be separatedly transported for the later fixing onto vehicles.

There are several specialties in the FIG. 6 demonstrated. One specialty is, that delivery fluid line 233 transfers a flow of fluid into positive displacement fluid motor 235 while the return flow out of fluid motor 235 flows through the medial passage 239 into a downstream fluidmotor 236 wherefrom the return fluid stream fluid flow flows through return fluid line 269 directly or indirectly back to a respective fluid flow producing means or tank. A secod fluid stream is led through delivery fluid lines 234 into positive displacement upstream fluid motor 255 and out therefrom to medial fluid line 259 into downstream fluidmotor 256 and return therefrom through return fluid line 269 directly or indirectly back to a fluid flow producing means or a tank. It is therefore assured that two flows of fluid which are separated from each other and which are flowing each one through fluid line 233 and the other line 234 are revolving all together. Thereby it is possible that only two flows of fluid can create four streams of fluid of proportionate rate of flow. For this purpose the rotary parts of the respective fluid motors are connected to the rotary members 238 or 237 or 257 or 258. Since the fluid flow producing means according to this invention necessarily provides the proportionateness of rate of flow in separated flows of fluid it is assured that a proportionateness of rotary velocity of the fluid motors is assured and thereby also of the rotary members of propellers 237 and 238 and 257 and 258 is assured. Consequently it is assured that four fluid streams are created by the hydraulically controlled fluid stream drive means of FIG. 6 and that the reaction forces and thereby the thrusts of the fluid streams are maintained proportionate under all operational conditions. As a further characteristic of the embodiment of FIG. 6, the rotary members are provided in ducts.

Thereby the thrusts of the fluid streams relatively to the hydrostatically controlled fluid stream drive can be considerable increased. For this purpose fluidmotor 235 is borne by flange means 244 in a fastening means 245 of ducting means or wing means 240. The shaft of the rotary member of fluidmotor 235 and thereby the rotary member 237 which is attached to the shaft of fluid motor 237 can be borne in bearing means 243 of fastening means 242. About in the same way fluid motor 236 is fastened by flange means 244 and fastening means 245 of wing means or duct means 241 and the shaft of fluid motor 236 may be guided in bearing means 243 which is fastened on fastening means 242 of duct means or wing means 241. Fluid motor 255 may be borne by flange means 244 on fastening means 245 of duct means or wing means 260 and the shaft means of fluid motor 255 may be borne in bearing means 243 of fastening means 242 of duct means or wing 250. Fluidmotors 256 may be borne by flange means or fastening means 245 of wing means or duct means 261 and the shaft of fluid motor 256 may be borne in bearing means 243 of fastening means 242 of duct means or wing means 261. The feature of this portion of this part of the embodiment of FIG. 6 is that the propellers or rotary members are safely contained in wings or ducts so that accidentally persons or animals could not come into the rotary members during their revolving. Furthermore the vehicle looks nice if the propeller or rotary members are provided in ducts or wings. Furthermore by the provision of ducts or wings the thrusts of the fluid streams which flow therethrough is considerably increased or the duct means or wing means may be used for bearing the vehicle partially or totally during its movement through fluid like water or air.

Another characteristic of the embodiment shown of a fluid drive shown in FIG. 6 is that a plurality of fluid flow producing means 232 and 252 which are actuated or driven by power plants 231 or 251 are provided and that they are connected to each other. For example they may have a common return or interconnecting return fluid line 264. They may also have an equal or some or separated suction or two delivery fluid lines which may transfer fluid out of a tank 268 into the respective fluid flow producing means 232 and 252. Each of the fluid flow producing means 232 and 252 is producing at least a pair of separated flows of fluid of proportionate rate of flow. One flow of fluid moves out of fluid flow producing means 232 through check valve means 266 into fluid line 233 and another flow of fluid of proportionate rate of flow flows separately out of fluid flow producing means 252 through check valve 266 into the common fluid line 233. By combining the flows of fluid each one flow of fluid which is coming out of the separated fluid flow producing means 233 and 252 via check valve 266 into a common fluid line 233 the fluid line 233 has become a common fluid line.

Out from fluid flow producing means 232 another flow of fluid of proportionate rate of flow flows through another check valve 266 into the fluid line or fluid delivery passage 234. Another flow of fluid which is also separated and of proportionate rate of flow flows out of the other fluid flow producing means 252 through another check valve 266 into the fluid line 234. By combining each flow of fluid out of fluid flow producing means 252 and 232 into one fluid line the fluid line or fluid flow delivery passage 234 has become a common delivery fluid line. If now during operation one of the power plants 231 of 251 would fail or if one of the fluid flow producing means 232 or 252 would during operation fail to deliver the separated flows of fluid then the other fluid flow producing means would still continue to deliver at least one flow of fluid into at least one common fluid line 233 and at least one other flow of fluid into another common fluid line 234. The respective respective check valves 266 would prevent a flow of fluid back out of the common fluid lines 233 or 234 back into the respective not delivering fluid flow producing means 232 or 252. Thereby a safe operation of the hydraulically controlled fluid stream drive means is assured and maintained even if one of the provided power plants or even if one of the provided fluid flow producing means would fail to deliver. The return fluid lines 269 may return the flows of fluid from the downstream motors directly or indirectly into the tank 268 or via cooling means into the tank 268 or directly into the respective fluid flow producing means 232 and 252 or in to the medial passage therebetween 264. Passage 264 may also be a drain line. The fluid lines 267 may be suction fluid lines or fluid lines which are delivering fluid into the fluid flow producing means 232 or 252 instead of providing only two fluid flow producing means 232 and 252. It may also be possible to provide a plurality or many of those fluid flow producing means and if necessary respective power plants 231 or 251 to adopt them to the respective fluid flow producing means 232 or 255.

Fluid flow producing means 232 or 252 could be provided preferably with fluid flow adjustment means 246 and 247. Thereby the displacement volumes of the positive displacement chambers in the fluid flow producing means 232 or 252 which are changing from minimum to maximum and vice versa during the operation of the fluid flow producing means shall be proportionately adjusted so that the subtraction of the minimum volume from the maximum volume of the respective positive displacement chamber remains at all times proportionate to the respective volumes of other of the positive displacement chambers.

It is possible to handle the adjustment control means 246 or 247 separatedly or combined together. The hydraulically controlled fluid stream drive of FIG. 6 may be set onto or built into all suitable vehicles which move in or through fluid or which are borne thereon like land vehicles, air vehicles, helicopters, aircrafts, boats, ships, submarines, sleds, aircushion vehicles or the like. Other means may be added to this hydraulically controlled fluid stream drive or some of its part disclosed therein may be subtracted.

Figure 8:
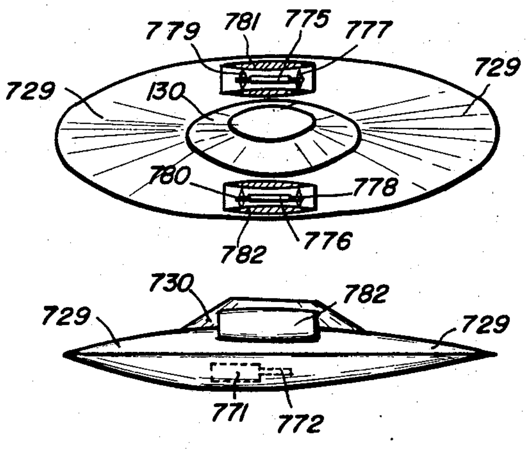
FIG. 8 shows in the upper part a perspective view from above and in the downwards part a view from the side upon another embodiment of this invention which is preferred to be a hydraulically controlled fluidstream driven saucer, and which might be able to run on land, on snow, on water, on mud and through air.

If both fluid streams are however separated without control means therebetween and if the rate of flow in both fluid streams is equal and the dimensions of the fluidmotors and rotary members is equal, then the vehicle will move straight forward and the resisting forces acting on body 729 and the other parts connected thereto would be in equilibrium with the driving forces created by the fluid streams which are created by the rotary members. The fluid-streams are then providing the stability of thrust onto the body and it is therefore preferred that the fluid stream producing means are set at equal distances sidewards of a centerpoint of the vehicle. The fluid flow means which are creating, via the cooperating members, the fluid streams are providing the straight forward motion or the curved or turning motion of the vehicle and thereby they are providing the drive as well as the control of the motion of the vehicle of FIG. 8.

Figure 7:
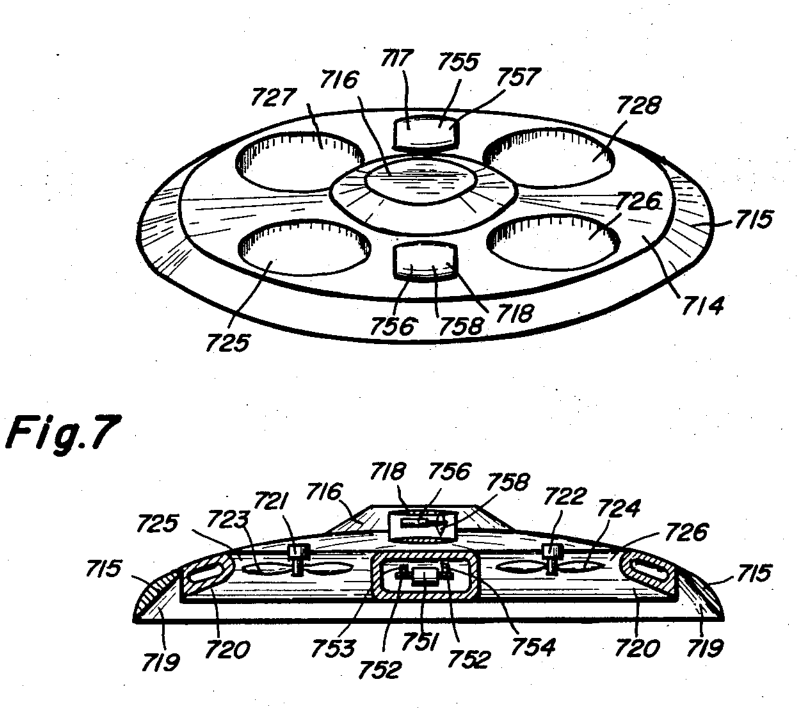
FIG. 7 shows another embodiment of this invention in the upper figure of it in a perspective view and in the below part of the figure a partial sectional view through another hydraulically controlled fluid driven vehicle which is preferred to be an air cushion vehicle.

In FIG. 7, a vehicle is shown which is borne either by propellers or rotary members with vertical axes like helicopters or the like or which is borne by rotary members in respective ducts or which is borne by an aircushion. Body 714 of the vehicle may be provided with cabin 716. Power plant 751 or a plurality thereof may be provided in or on the body of the vehicle. Fluid flow producing means 752 may be connected to the power plant or may be a self-sufficient fluid flow supply means. Out from the fluid flow supply means 752 respective fluid flows may be let to fluid motors 721 and 722. Fluidmotors 721 and 722 may drive rotary members 723 and 724. The fluidmotors 721 and 722 and the thereto connected revolving members or propellers 723 or 724 may be provided in respective substantially vertical ducts 725 and 726 and also in respective substantially vertical ducts 727 and 728.

It is preferred to provide either pair of vertical ducts with revolving members therein or a plurality of pairs. In the upper part of FIG. 7, it is visible that four substantially vertical ducts are provided in this example of the embodiment and that they are shown by reference numerals 725, 726, 727, and 728. In each of those ducts, respective fluid motor means and rotary members connected thereto are provided. It is preferred to make them of equal size, but is would also be possible to make them of proportionate size. It is now possible in a vehicle with four substantially vertical ducts either to let one fluid stream from fluid flow producing means 752 through the fluid motor in ducts 727 and then through the duct in 726 and return to the fluid flow producing means while another fluid flow of equal rate of flow could flow through the fluid motor in ducts 725 and then through the fluid motor in duct 728 and then back to the fluid flow producing means. The flows could also be in a vice versa direction. It would also be possible to set a fluid flow producing means for the provision of such number of separated flows of equal rate of flow as substantial vertical fluid motors and rotary members connected thereto and dusts are provided. In such a case, one fluid flow would drive the fluid motor and rotary member in ducts means 725 another one separated fluid flow of equal rate of flow would drive the fluid motor and rotary member connected thereto in duct 726. Another fluid flow of equal rate of flow would also as a separated fluid flow drive the fluid motor and thereto connected rotary member in duct means 727. Still another separated flow of fluid would flow through a fluid motor in duct means 728 for driving the respective revolving member thereon. By the means described heretofore it is assured that all rotary members in the duct means 725, 726, 728 and 727 are of proportionate rotary angular velocity.

Thereby it is assured that the vehicle is stably borne in the air, ascending in the air, or decending in the air or in water. It is also possible to use this vehicle as an air cushion vehicle. For this purpose it is preferred to set an air cushion housing 715 around the vehicle. This air cushion housing 715 may be able to swing downwards or to swing straightly horizontal. If it is swung downwards then a respective air cushion might be developed by the heretofore described rotary members in a respective cushion 719. For such a purpose, the air or fluid flows through the ducts downwards and creates an area of higher pressure within the space 719 below body 714 and this space of higher fluid pressure may be kept within and surrounded by the cover means 715. The cover means 715 or housing means 715 can be formed in such a way that the horizontal cross-sectional area through the air cushion space becomes relatively large in order to provide a great lift to the vehicle. By swinging the cover means or housing 715 into horizontal or inclined downward position the vehicle can be transformed from speedily horizontal movement through the air to a typical air cushion vehicle type movement above the surface of the water or above other surfaces like land surfaces or the like. In order to drive the vehicle forwards or backwards or to turn it or to let it fly in a curve, a fluid flow producing means 752 or a plurality thereof is providing two separated flows of fluid of proportionate rate of flow which are shown by reference numerals 753 and 754. Fluid flows 753 is let into fluid motors 755 for revolving the rotary parts thereof and to return them directly or indirectly into the fluid flow producing means 752. The other separated fluid flow of equal rate of flow flows through fluid line 754 into and through fluid motors 758 and then directly or indirectly back into the fluid flow producing means. Rotary members 757 or 758 are connected to the rotary parts of the fluid motors 755 or 756. The rotary members and or fluid motors may be set into respective duct means or ring wings 717 or 718.

Since the rate of flow in the both fluid streams 754 and 753 are proportionate the respective rotary parts of the fluid motors 755 and 758 are revolving with proportionate rotary angular velocity and so do the respective rotary members 757 and 758 which are connected thereto. The rotary members 757 and 758 are then producing fluid streams which are creating a reaction force which drive the vehicle either forward or backward or which turn it or which let it fly a curve depending on the sizes and configuration of the parts. In cases when the rotary members and the therewith cooperating heretofore mentioned parts are equal then the fluid streams would also be of equal rate of flow and thereby of equal thrust as long as the rate of flow in the separated fluid flows 753 and 754 is equal in such cases the thrust forces acting out of the fludstreams which are created by rotary members 757 and 758 acting on the vehicle of the body 714 and drive the vehicle in a straight forward or straight backward motion and thereby the equilibrium of the thrust forces and the resistance forces acting on the vehicle and parts will be in equilibrium which in turn maintains the stability and the straight forwards and straight backwards motion of the vehicle. Fluid flow control means described in other embodiments of this invention may be provided in order to change the rate of flow relative to each other in the fluid line 753 and 754 for forcing the vehicle to fly a curve or to let it turn on a point either clockwise or counter-clockwise. The vehicle which is shown in FIGS. 7 upper part of the figure is therefore able to fly through air as well as a helicopter or as an aircraft and it can also act as an air cushion vehicle for movement over water land or snow ice or the like. It is possible to provide other embodiments and parts of other figures of the inventions onto the vehicle of FIG. 7 or to give parts or features of FIG. 7 into other features or vehicles of this specification.

If the fluid flow producing means 862 is variable from zero to maximum then control fluid flow may flow through interfluidlines 863 into medial fluid line 854 and then it is possible to maintain an equal or proportionate velocity between revolving members 857 and 858 if the rate of flow in the additional control flow 863 is zero. When a small rate of flow is appearing in the interfluidline 863 as more faster the fluidmotor 856 and the revolving member 858 connected thereto will revolve. This higher revolution of revolving member of the downstream fluid motor 858 will result in a bigger lift and this bigger lift will then incline the vehicle of FIG. 10m in a motion in the direction to fluidmotor 855. It is apparent from the description and the figure that as faster as the rate of flow in the interfluidline 863 is as more the vehicle will incline and consequently as more the vehicle will move forward. The specialty of this FIG. 10 is that an additional fluid flow is not adopted to differences in flow through by-pass means depending on different viscosities in the flow. If fluid flow producing means 862 for producing the additional control flow is a postive displacement variable fluid pump then the quantity of fluid or the rate of fluid flow which flows through interfluidline 863 can be accurately controlled in all details so that very small inclinations and very small changes in inclination of the vehicle can be definitely controlled thereby and thereby the whole movement of the vehicle can be very sensibly and accurately governed. Instead of providing only one serial system with a pair of fluidstreams therein, there could also be several pairs of fluid streams in serial connection provided in the vehicle of FIG. 10 also in the serial connections instead of connecting only two fluid motors to one series it would also be possible to connect a plurality thereof into it.

In FIG. 10 a fluid borne vehicle is shown wherein a body 850 carries fluid motors 855 and 856 on spaced locations thereof. Revolving members or propellers 857 or 858 are connected to the rotary parts of respective one of the fluid motors 855 or 856. A fluid flow producing means 852 driven by a power plant 851. A flow of fluid flows from fluid flow producing means 852 through the delivery fluid line 853 into and through the rotary parts of fluid motor 855. The fluidstreams leave the fluid motor 855 and flows through medial fluid line 854 into and through the rotary parts of fluid motor 856. Thereafter the fluidstream returns through the return fluid line 869 by this serial connection of at least a pair of fluidmotors in a fluid flow circuit. The proportionateness of the angular rotary velocity of the fluidmotors 855 and 856 is obtained. Therefore also a proportionateness of the rotary velocity of the revolving members or propellers 857 and 858 is also maintained. In order to provide a forward movement of the vehicle it is now possible in accordance with the embodiment of FIG. 10 of this invention to provide an additional fluid flow producing means 862 which may be driven by an additional power plant 861. It may also be possible to provide an additional fluid flow producing means within the fluid flow producing means 852. In any case however variable or non-variable but preferably variably flow of fluid which is an additional control flow may be supplied and flow through a fluidline 863 into the medial fluidline 854. Thereby according to the rate of flow through interfluidline 863 less or more additional fluid is supplied into the medial fluidline 854. This forces the rotary parts of fluidmotor 856 to revolve faster then the upstream fluid motor 855.

It would also be possible to provide the vehicle of FIG. 10 by separated flows of fluid so that a separated flow of fluid drives fluidmotors 855 while another separated flow or fluid would drive fluid motor 856. The separatedness of the flows would assure the proportionateness of the same. The rotary velocities of the rotary members 857 and 858 would then also still remain the same. Additional control flows could then lead into one or the other of the fluid motors and thereby provide a respective faster revolving of the respective fluid motor and so take care for the inclination and thereby for the movement for the vehicle.

A very safe vehicle can be built as shown in FIGS. 9A and 9B. FIG. 9A shows a vehicle in a sidewards view while FIG. 9B whows the vehicle from the front. In FIG. 9A the vehicle is shown so that it is read for vertical movement or vertical take-off or decending. In FIG. 9B it is shown for a substantially horizontal flight.

The vehicle has four wing means and four rotary members provided in such a way that at least one rotary member is connected to each wing means. The wing means can be usual straight wings or they can be ring wings or ducts. Wing means 804 are configurated as straight wings while the ring wing means 806, 807 808 and 809 are in this illustration formed as ducts or ring wings. The wing means can be swung or pivoted substantially from vertical to horizontal position. Wing means 804 can swing around the bearing means 805 from horizontal into vertical position and vice versa.

The wing means 808 and 809 can swing around the bearing means 801 from a vertical into a horizontal or vice versa position. The bearing means 811 may be borne in the vehicle extension 810 or a plurality thereof which is fixed or which are connected to body 801 of the vehicle. Fastening means 833 is connected to wing means 804 for the bearing of drive means 835 for revolving a revolving member 837 thereby. Fastening means 834 is on the other side of body 801 fastened to wing means 804 for bearing a drive means 836 with a rotary member 838 thereon. By fastening means 843, the drive means 845 is fastened and it drives a rotary member 847 connected thereto. The fastening means 844b bears a drive means 846 whereto a rotary member 842 is connected. Fastening means 844 provides a fastening of drive means 846 to wing means 809 while fastening means 843 provides the fastening of drive means 845 to wing means 808.

The drive means are interconnected with each other so that all of the four drive means 836, 835, 845 and 846 are revolving with proportionate rotary angular velocity. Consequently it is assured that the rotary members 837, 838, 847 and 848 are revolving with proportionate rotary angular velocity. If the axes of the rotary members are set vertically as shown in the upper part, in FIG. 9A, then the rotary members if they are revolving are creating four fluid streams which are of proportionate rate of flow which are providing the stable vertical upwards or downwards movement or rest of the vehicle in the air. In such cases the four rotary members are providing four thrust points by the fluid streams created by the rotary members and these thrust points are providing the four lift centres 891 and 892.

The several lift centres 891 and 892 can be set as a resultant lift centre force 894 which is shown in FIG. 9A. The centre point of the lift centre force 894 is located above the gravity point 893 of the vehicle. During a vertical flight or rest in the fluid, the lift point 894 above the gravity point 893 provides the stable location of the vehicle thereby that the lift points 894 tracts upwards while the gravity point 893 tracts downwards. In order to achieve this power play of the lift centres and of the gravity centre it is necessary that the four axes of the rotary members 846, 847, 837 and 838 are proportionately or diametrically or equally diametrically or oppositionally distanced from a respective centre point or centre line of the vehicle's body 801. For the forward movement, the axes of the rotary members are swung substantially horizontally and then the fluid streams which are created by the rotary members are providing the thrust forces on the vehicle in order to push the vehicle forwards or backwards. Again it is necessary to provide the axes of the rotary members in such a way that also in horizontal position the axes are proportionately spaced from a respective axes of the vehicle.

In order now to get a convenient vehicle which is relatively short and relatively narrow in size and which will always be stable during vertical flight as well as during horizontal flight and wherein the pilot or the passengers will have at all times a good view it is preferred in accordance with this embodiment to provide the bearing member 805 in such a way that the wing means 804 can swing around the axis of the bearing means 805.

Bearing means 805 for this purpose is connected to body 801. Body 801 may have a passenger or freight cabin 813. It is preferred to provide a centre portion of the wing means 804 stably and fixed to the body 801. It is especially convenient in accordance with this embodiment of the invention to provide the centerportion with a non-swinging portion 804 of the wing means 804 above the cabin 813. Relatively in front of the centerportion of the wing means 804, a bearing means 805 provided. On both sides of the centre wing, means 805 are each one wing means 804 provided and fixed to the bearing means 805. The wing means 804 can then swing around bearing means 805. As one preferred specialty the drive means 835 and 836 with their revolving members 837 or 838 are provided in ducts 806 or 807. The ducts 806 and 807 are so connected to the wing means 804 that the ducts are downwards of the wings means 804 located if the wing means 804 are substantially horizontally set. If however the wing means 804 are swung or pivoted into a substantially vertical position then the axes of the drive means 835 and 836 are swung into position forward of wing means 804. It is therefrom to be understood that it is preferred that the duct means 806 and 807 shall not swing around their center points but around their upper necks. Thereby it is obtained that the ducts 806 and 807 are below the wings 804 in a horizontal position while they are swung out to a position forward of the vehicle's body 801 when they are swung into vertical position. On contrary thereto the wing means or duct means 808 and 809 may be swung around their centerpoints by bearing means 811. So it can be obtained that the axes of the duct means 808 and 809 are substantially equal distanced from the gravity line and the lift lines 893 and 894 of the vehicle for vertical flight but oppositionally to the duct means 806 and 807.

It is the location of axes of bearing member 805 which makes it possible to assure that the duct means 806 and 807 are so far backward relative to body 801 that the pilot still has a nice view when the duct means are swung into horizontal position and on the other side that the distance of the axes of the fluidstreams through duct means 806 and 807 are so widely brought forward, that they are largely enough distanced from the gravity centre 893 and the lift centre 894 that the maintenance of stability of lift forces 894 and gravity forces 893 remains maintained for vertical movement or rest. Extension 810 of vehicle body 801 may assure that the rotary members 847 and 848 are so high above the body of the vehicle located that the fluid streams created thereby do not collide with the other fluid streams which are created by rotary members 837 and 838. Extension 810 is therefore an important means in order to provide that the fluid streams created by rotary members 847 and 848 are above the fluidstreams which are created by rotary members 837 and 838 during horizontal flight of the vehicle. Furthermore all rotary members are spaced from body 801 sidewardly so that the stability of the thrust forces or of the lifting forces relatively to the vehicle's body or its gravity centre or its resistance is assured during the vertical flight or rest as well as during the horizontal movement. Radar means 803 may be connected by pivot means 802 to body 801 or to extension 810 in order to control the horizontal flight of the vehicle.

An important necessity which is illustrated in FIG. 9B of the invention is, that the axes of the four rotary members must be so located relatively to body 801 that they are during vertical position sidewardly distanced from the vehicles body and upwardly and downwardly distanced relatively to each other so that one fluid stream does not flow against the other fluid stream or crossing therewith.

This condition, that the fluid streams are never crossing each other, must also be maintained from or during the swing from vertical to horizontal or vice versa. Therefore the sidewards spacing and upwards spacing relative to body 801 is preferred as done in these figures. Also during the horizontal flight the sidewards spacing and the upwards and downwards spacing of the axes of the different rotary members must be kept maintained and during the vertical positioning of the axes of the rotary members their sidewards spacing relatively to body 801 of the vehicle as well as their forwards and backwards spacing of the gravity point of the vehicle must be maintained. Therefore the location of the axes of the rotary members so as shown in FIGS. 9A and 9B is preferred.

The vehicle may also have wheels or sleds 812 for running the vehicle on land, ice snow or the like by means of putting the axes of the rotary members into a substantial horizontal position. The drive of the rotary members might be interconnected mechanically in order to assure the proportionateness of the rotary velocity or it may be interconnected hydraulically. The mechanical connection of drive means to rotary members which are able to swing in such a way as shown in the FIGS. 9A and 9B is however very difficult. Therefore it is preferred to drive the drive means by fluid power. For this purpose drive means 835 and 836, and 845 and 846 are fluidmotors and to the rotary parts thereof are the respective revolving members 837,838,847 and 848 connected. A plurality of power plants 801 and fluid flow producing means 802 is provided on or in the vehicle. It is preferred to provide them in space 814 in the bottom of body 801 so that the weight of the fluid flow producing means and of the power plants creates a concentrated gravity centre 893.

The deeper these heavy parts are located inside of body 801 the more stable the vehicle will become. One or more of the fluid flow producing means 802 may deliver four separated flows of fluid of equal rate of flow. Each one of those separated flows of fluid of equal rate of flow may drive one of the fluidmotors 835, 836, 845 or 846. By the proportionateness of the rate of flow in the separated fluid streams the proportionateness of the rotary angular velocity of the rotary parts of the said fluid motors is assured. Consequently also the proportionateness of the rotary angular velocity of the rotary members 837, 838,847 and 848 which are connected to the rotary parts of the fluidmotors is assured thereby. If however the proportionateness of the rotary velocity of the rotary members 837, 838,847 and 848 is assured then also the stability of the vertical or horizontal or inclined movement of the vehicle is assured as already described heretofore. Another means to assure the proportionateness of the rotary velocity of the rotary members is to let one or more of the fluid flow producing means 802 are delivery two flows of separated fluid. In such a case each two of the fluid motors may become connected into a series. In such a case one flow of fluid may flow from a respective fluid flow producing means 802 through fluid motor 835 as upstream motor and then through a respective medial fluid line to and through downstream motor 845 and then directly or indirectly back to the fluid flow producing means. The other flow of fluid of proportionate rate of flow may flow from a respective fluid flow producing means 802 through an upstream fluid motor 836 and then therefrom through a medial fluid line into and through a downstream fluid motor 846. In such a case by two separated flows of fluid the proportionateness of the rotary angular velocity of all four fluid motors and all four rotary members is assured by the provision of two fluid flows with each two fluid motors in series.

By combining a plurality of fluid flow producing means into combined fluid lines as heretofore in other embodiment of this invention illustrated especially safe vehicle is assured because if one fluid flow producing means or one power plant would fail and the others would continue to work and the vehicle could continue its flight or movement. By combining variable fluid flow producing means from multi-fluid flows into one combined fluid flow adjustment means handle the rotary velocity of all the rotary members can be changed and controlled by one single control means. Drive means for inclining the axes of the rotary members may also be provided. They could, for example, be hydraulic cylinders set between a delivery passage and a return passage of respective fluid motors so that without any additional fluid flow supply the control of the inclination of the axes of the rotary members can be materialized by the pressure drop between delivery passages and return passages. The inclination means could however also be driven in other ways. A special safe way is to drive the inclination means for inclining the axes of the rotary members or to pivote them from vertical to horizontal or vice versa by fluid power means. In such cases four separated flows of fluid should be provided and those separated flows of fluid should be of proportionate or equal rate of flow. Then the paralletity of the inclination movement of the axes of the rotary members is assured. That is especially necessary in order to keep the vehicle or aircraft stable under all flight or movement conditions. The control of the rotary velocities of the revolving members can be assured by the separateness and proportionateness of the fluid flows and certain additional control means like by pass means or additional control flows and other embodiments of this invention aimed for the control purposes.

The feature of the vehicle of FIG. 9 is, that such vehicle is at any time stable during vertical rest or flight as well as during horizontal flight. Furthermore if during flight the whole power supply and fluid flow drive would fail to operate then the vehicle could slide down to the earth because it has wings and ducts which can bear the vehicle if a certain velocity of the vehicle through the air becomes maintained. The vehicle is therefore very sure in operation.

Figure 11:
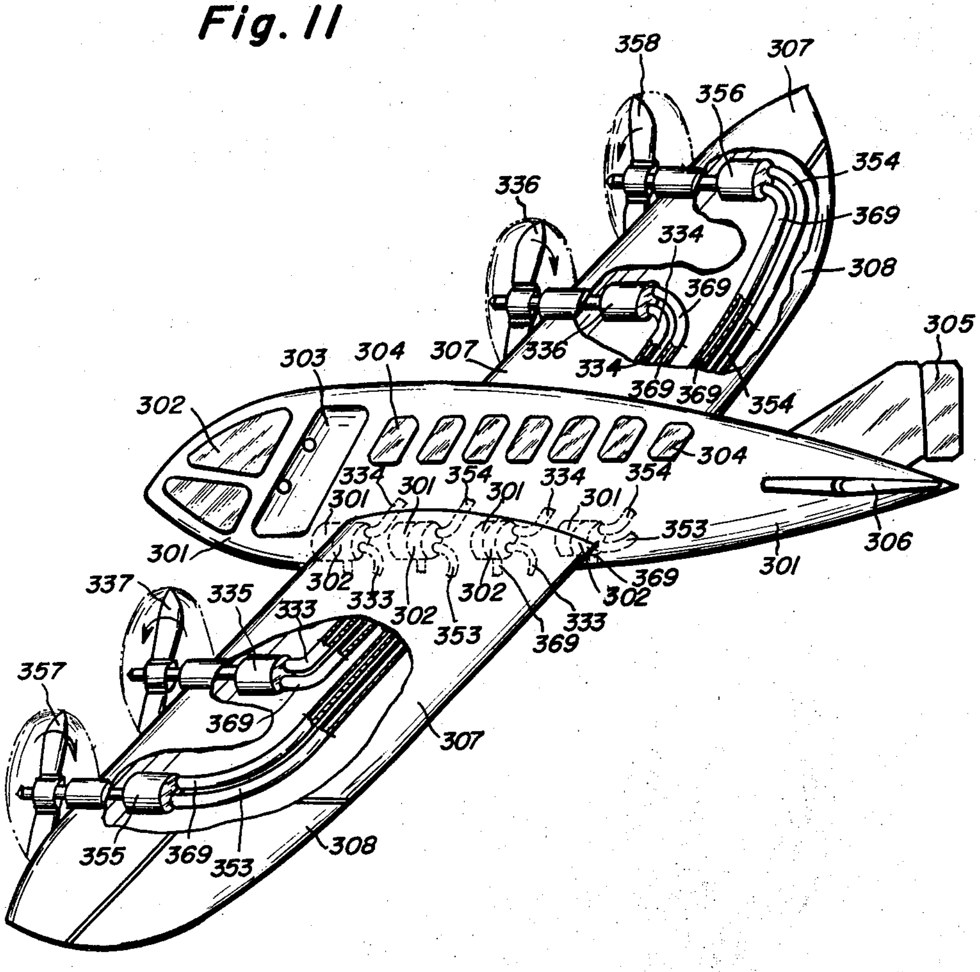
FIG. 11 is a perspective view upon a partially containing sectional views through parts of another hydraulically controlled fluidstream driven vehicle of this invention which constitutes anolther embodiment of this invention and which is preferred to be a multi-rotor-member driven and multi-fluid stream driven aircraft.

In FIG. 11 an aircraft is provided which is somewhat similar to that of FIG. 1. The specialty of the aircraft of FIG. 1 is however, that a plurality of propellerpairs is provided. In this case two propellerpairs are shown so that the aircraft has altogether four propellers. The feature of such a provision is, that for example propeller rotary members 337 and 338 can be fixed propellers of a certain inclination of the propellers blades while the inclination of the propeller blades or revolving members 357 and 358 might have another inclination. This would make it possible if one propeller pair is very effective during little horizontal movement velocity while the other propellerpair is very effective then at a high speed of the aircraft. It is then possible to provide an aircraft which has an effective propellerpair at the starting time and also an effective propellerpair at the high speed flight time. In such a way most propellerpairs can ecconomically assist each other and it is therefore possible to make the propellerpairs of fixed nature of inclination so that the varification of the inclination of the propellerplates or rotary member blades is no longer necessary. This makes it possible to build aircraft inexpensively. Since there are two or more propellerpairs, there are consequently two or more sepatared flows of fluid of equal rate of flow. Fluid-flow 333 drives fluidmotor 335 and returns to a return line 369. Fluid flows 334 drives fluidmotor 336. Fluidflows 354 drives fluidmotor 356. All fluidflows are returning through respective return pipes 369 directly or indirectly back into the fluid flow producing means. All delivery flows 333 and 334 are of equal or proportionate rate of flow. The other fluidstream pair 353 and 354 are also separated from each other and are also of proportionate rate of flow. It is preferred to set a plurality of fluid flow producing means 302 and they may be driven by a plurality of power plants 301.

The separated flows of equal rate of flow of different fluid flow producing means 302 may be combined together to common fluid lines with check valves therebetween as already known from earlier figures. It is very convenient to combine a plurality of fluid flow producing means adjustment devices together to a combined fluid flow adjustment means control. The relatively compact size of fluidmotors makes it possible to locate them also in small spaces in the wing 307. Furthermore it is very simple to let the rotary members revolve in oppositional direction. Because it is easy to reverse the rotary direction of a fluidmotor. So for example revolving members 337 and 338 may revolve in oppositional direction. Rotary members 357 and 358 may revolve in oppositional direction to rotary members 337 and 338. That can easily be handled by separate connection of separated fluid lines. Also it is proposed that the heavy parts like to power plants and fluid flow producing means are located at the bottom or in the bottom of the body 301 of the vehicle. On contrary thereto the freight or passenger cabin 304 may be located thereabove. An entrance means 303 may be provided for letting poeple or fraight enter or exit the cabin 304. Cabin 302 may be the pilot cabin and the pilot therein which drives the aircraft has an aircraft at hand which due to this invention is especially easy to be handled. The easiness of handling is assured first thereby that a common control means by means of one control handle or control device only controls the rate of flow of fluid all fluid streams and thereby the rotary angular velocities of all rotary members. The pilot does not need any more to correct the rotary velocity of each of the revolving members relatively to the other. This is done automatically by the separateness of the flows of fluid of equal rate of flow.

Furthermore since it is possible to provide a rotary members or propellers of different inclinations of their blades in such multi-propeller driven aircraft, it is no longer necessary to take care of the inclination of the respective propeller blades. This all simplifies the piloting of the aircraft very much. Control rudders 305 and 306 may be provided in the usual manner and so may be the rudders 308. Propeller or rotary member 337 is driven by the rotary parts of fluid motors 335. Rotary member or propeller 338 is driven by the rotary parts of the fluidmotors 336. Rotary member or propeller 357 is driven by the rotary parts of fluidmotors 355 and rotary member or propeller 358 is driven by the rotary parts of fluidmotors 356. The said fluid motors are positive displacement fluid motors.

Instead of driving all of the fluidmotors by separated flows of fluid as described heretofore it would also be possible to connect each two or more propellers in fluid flow series. So for example it would be possible to direct fluid through fluid motors 336 as upstream motor and then lead it through a medial pipe through fluid motors 355 as a downstream motor and then directly or indirectly back to the fluid flow producing means. While the other separated flow of fluid could be directed through fluid motor 335 as an upstream motor and then through a medial pipe through fluidmotors 356 and then directly or indirectly back to a tank. Another possible serial connection would be to direct one flow of fluid through fluid motor 335 as upstream motor and then through a medial fluid line and through fluid motor 355 as a downstream motor and then directly or indirectly back to the fluid flow producing means and to lead the other flow of fluid of separated flows of fluid of equal rate of flow through fluidmotor 336 as an upstream motor and then through a medial fluid line into and through fluid motor 356 as a downstream motor and then directly or indirectly back to the fluid flow producing means.

It is preferred to set respective cooling means into return fluid lines in order to cool the fluid so that not too much fluid is needed. Also respective tank means for the hydraulic power supply should be supplied. The aircraft of FIG. 11 is very safe, simple and inexpensive. It is very convenient to lead the fluid lines through the wings and it is also very convenient to set the power plants at places were the heavy weight assists the stability of the gravity centre. Another convenience is that the fluid motors can be very little and that they can be set any desired place relative to the wings or to the body. The other convenience is that the proportionateness of the fluid streams which are created by the rotary members is at all times proportionate or equal so that the maintenance of the equilibrium of the driving fluid streams and the resistance forces acting on the vehicle is at very time assured. That in turn assures the stability of flight or movement of the vehicle and thereby controls its movement in general. It would be possible to control the whole vehicle only by fluid flow control means like heretofore described without having the necessity of rudders 305, 306 and 308. The rudders would assist the possibility of controlling the aircraft and they can therefore be provided. The rudders itself could be driven by hydraulic fluid power cylinders or motors and those might be set in the downstreams or medial streams of the fluid power supply or they might get separated fluid power supply means. The availableness of return flows of the hydraulic power supply however would make it possible to drive many other accesories in the aircraft like landing gears, propeller inclination adjustment control, rudders, service on board and the like.

The invention heretofore described is not restricted to the embodiments which are shown in the figures. The main principle of theinvention is that a plurality of fluid streams of proportionate or equal rate of flow is created by a plurality of separated fluid flows of proportionate or equal rate of flow and that the said plurality of fluid streams keeps the equilibrium to the forces which resist the movement of the vehicles so that this equilibrium in combination of the described means are controlling the straight forward or backeards or curved or turning movement of the vehicle.

It is possible to change one characteristic or some characteristics of features or one of the figures into suitable places of other fifures of this invention and vice versa. It is also possible for those skilled in the art to provide the hydraulically controlled fluidstream driven vehicle of this invention or the means thereof into other kinds of vehicles which are not in detail shown or described in the figures of this specification. It is therefore possible to apply the means and objects of this invention to other vehicles or machines without leaving the scope of this invention and it is therefore intended that the patent shall cover by suitable expression what any feature or patentable novelty resides in the figures or specification or disclosure of this invention.

What is claimed is:

1. A fluid stream driven aircraft comprising, in combination, a body having an axis of substantial symmetry; at least one pair of hydraulic fluid operated motors on said body; a pair of stream creating means driven by said motors, respectively, and arranged symmetrically on opposite sides of said axis; at least one hydraulic fluid flow producing means having at least a pair of separate fluid handling chambers connected to separate outlets, and including means for fluid-tight separation of the chambers and outlets; a pair of displacement means associated with said fluid handling chambers, respectively; common actuator means cooperating with said two displacement means for maintaining equal movements of said two displacement means so that fluid flows in said outlets at proportionate and equal flow rates, said actuator means including an eccentric actuator ring for guiding said displacement means; a pair of delivery passage means connecting said outlets with said motors, respectively, whereby said air stream creating means on opposite sides of said axis are driven at equal velocities for producing equal thrusts on both sides of said axis for stabilizing the movement and attitude of said aircraft; and flow adjusting means for displacing said actuator ring so that both displacement means are simultaneously and equally adjusted to vary the equal flow rate in said outlets.

2. A fluid stream aircraft comprising, in combination, a body having an axis of substantial symmetry; at least one pair of hydraulic fluid operated motors on said body; a pair of stream creating means deiven by said motors, respectively, and arranged symmetrically on opposite sides of said axis; at least one hydraulic fluid flow producing means having at least a pair of separate fluid handling chambers connected to separate outlets, and including means for fluid-tight separation of the chambers and outlets; a pair of displacement means associated with said fluid handling chambers, respectively; common actuator means cooperating with said two displacement means for maintaining equal movements of said two displacement means so that fluid flows in said outlets at proportionate and equal flow rates, said actuator means including an actuator cam for guiding said displacement means; and a pair of delivery passage means connecting said outlets with said motors, respectively, whereby said air stream creating means on opposite sides of said axis are driven at equal velocities for producing equal thrusts on both sides of said axis for stabilizing the movement and attitude of said aircraft; and flow adjusting means for displacing said actuator cam so that both displacement means are simultaneously and equally adjusted to vary the equal flow rate in said outlets.

3. A fluid stream driven aircraft comprising, in combination, a body having an axis of substantial symmetry; at least one pair of hydraulic fluid operated motors on said body; a pair of stream creating means driven by said motors, respectively, and arranged symmetrically on opposite sides of said axis; at least one hydraulic fluid flow producing means having at least a pair of separate fluid handling chambers each connected to one of a pair of separate outlets, and including means for fluid-tight separation of the chambers and outlets so that fluid from each chamber passes through one of said outlets only; a pair of displacement means associated with said fluid handling chambers, respectively; common actuator means cooperating with said two displacement means for maintaining equal movements of said two displacement means so that fluid flows in said outlets at proportionate and equal flow rates; and a pair of delivery passage means connecting each of said outlets with a different one of said motors, respectively, whereby said air stream creating means on opposite sides of said axis are driven at equal velocities for producing equal thrusts on both sides of said axis for stabilizing the movement and attitude of said aircraft.

4. The aircraft of claim 3 wherein said actuator means are adjustable, and including adjusting means for said actuator means.

5. An aircraft as claimed in claim 3, including flow adjusting means connected to said fluid flow producing means and operable to adjust the flow through the two outputs in a proportionate manner to vary the speed of said vehicle.

6. An aircraft as claimed in claim 3, including plural pairs of hydraulic fluid motors; said connecting means connecting one output of said fluid flow producing means to a motor on one side of said axis and including an intermediate line connecting a motor on the opposite side of said axis in series with said motor on one side of said axis, and the other output of said fluid flow producing means having a motor on one side of said axis and a motor on the opposite side of said axis connected in series thereto.

7. An aircraft as claim in claim 3 including at least two hydraulic fluid producing means each having first corresponding outputs commonly connected to the motors on one side of said axis and second corresponding outputs commonly connected to the motors on the opposite side of said axis.

8. An aircraft as claimed in claim 3, in which said aircraft having a fuselage constituting said body, and a pair of wings; one motor being mounted on each wing and said fluid flow producing means being mounted in said fuselage; said fluid stream creating means comprising traction propellers driven by said motors.

9. An aircraft as claimed in claim 3, in which said aircraft having a fuselage, constituting said body, and a pair of wings extending from said fuselage; each of said wings having a duct extending perpendicularly therethrough; each motor being mounted to extend coaxially of a respective duct said fluid flow creating means comprising respective propellers rotatable in said ducts, whereby to provide for sustaining of said aircraft by the thrusts of said propellers; said fluid flow producing means being mounted in said fuselage; a further propeller mounted at the front end of said fuselage; power means driving said fluid flow producing means; and means connecting said power means to said further propeller to rotate the latter.

10. An aircraft as claimed in claim 3, in which said aircraft having a fuselage constituting said body; said fluid flow producing means being mounted within said body, two pairs or wings extending from opposite sides of said body; said aircraft having four motors, one motor mounted on each of said wings, and said fluid flow creating means comprising respective propellers driven by said motors; said hydraulic fluid flow producing means having four separate outputs each connected to a respective motor.

11. The aircraft of claim 3 wherein a plurality of fluid flow producing means are provided; each of said fluid flow producing means supplying a plurality of separated flows of fluid of proportionate rate of flow into a plurality of separated fluid lines; some of said plurality of fluid flow producing flow circuit system of a plurality of separated flows of fluid of proportionate rate of flow and others of said plurality of fluid flow producing means communicated together to another combined multiflow circuit system of a plurality of separated flows of fluid of equal rate of flow, so that both combined multiflow circuit systems may either be combined or independently operated and controlled; at least a pair of separated fluid lines of at least two of a plurality of fluid flow producing means in each of said combined multiflow circuit systems are combined together to respective pairs of separated common fluid lines; pairs of separated positive displacement fluid motors communicated to pairs of separated common fluid lines; at least each one fluid motor of said pairs of separated positive displacement lines of the pairs of fluid lines; said combined members to the said fluid motors actuating at least two pairs of together or independently operable and controllable streams of fluid, wherein the streams of each pair of streams of fluid are of proportionate rate of flow, and wherein means are included for preventing return flow from said separated common fluid lines to and through at least one of said fluid flow producing means.

12. The aircraft of claim 3 wherein a pair of wings is provided on the body of the aircraft, extending laterally therefrom and having each a pair of propellers fixed to said wings and connected to hydrostatic motors for driving the same, so that each wing has an inboard motor and an outboard motor, the inboard motors providing a first motor pair and the outboard motors providing a second motor pair; and that each fluid line is connected from a respective separated output of a respective working chamber group of the fluid flow producing means directly to one of the motors of the first motor pair, so that each medial fluid-line is connected from the respective output of the respective motor of the first motor pair to the entrance port of the respective motor of the second motor pair and each return fluid line is connected from the respective exit port of the respective motor of the second motor pair to the entrance port of the fluid flow producing means.

13. An aircraft as claimed in claim 3, in which said aircraft having a fuselage constituting said body; two pairs of wings, each including a wing extending from a respective opposite side of said body, one of said pairs of wings being arranged adjacent the forward end of said body and the other pair of said wings being arranged adjacent the rear end of said body and substantially above level of said one pair of wings; each pair of wings being mounted on said body for movement between a substantially horizontal attitude and a substantially vertical attitude; each wing including a duct extending transversely thereof; there being four of said motors, each mounted coaxially of a respective duct and each driving a respective propeller constituting one of said fluid stream creating means and disposed within the respective duct; and means operable to move said wings between a substantially horizontal position in which the axes of said ducts are substantially horizontal, for horizontal travel of said vehicle, and a vertical position, in which said axes of said ducts are substantially vertical, for vertical movement of said vehicle; the level of the wings of the reward pair being sufficiently higher than the level of the wings of the forward pair that the respective air streams created thereby do not interfer with each other.

14. An aircraft as claimed in claim 3, in which said aircraft having a fuselage constituting said body and a pair of wings, one extending from each side of said fuselage; said aircraft having four motors, two mounted on each of said wings, each motor driving a respective propeller constituting a fluid flow creating means; said propellers being arranged in two pairs, one constituting an inboard pair of propellers and the other constituting an outboard of propellers; said propellers having fixed blades and the angle of inclination of the blades of the inboard propellers differing from the angle of inclination of the blades of the outboard propellers; the angle of inclination of the blades of one pair of propellers being particularly effective for slow speed operation and the angle of inclination of the blades of the other pair of propellers being particularly effective for high speed operation.

15. An aircraft as claimed in claim 3 including additional separatedly actuated and passed fluid flow means selectively operable to vary the relative rates of flow of hydraulic fluid to the motors on respective sides of said axis to effect a turning movement of said aircraft.

16. An aircraft as claimed in claim 15, in which said additional hydraulic fluid flow means is connected to the motor on one side of said axis; restricted in rate of flow to a minor fraction of the main flows and a control device interposed between said additional fluid flow and said last-mentioned motor and selectively operable to direct at least a portion of said additional output to said last-mentioned motor.

17. An aircraft as claimed in claim 3, in which a respective bypass line is associated to at least each one motor on each side of said aircraft; each bypass line including an orifice for restricting the rate of flow therethrough to a minor fraction of the main flows; and a fluid return line; a passage portion of a rate of flow restricting narrow crossectional area included in each bypass line and a respective bypass flow control means associated with each bypass line.

18. An aircraft as claimed in claim 17, including a common manually operable control device connected to both of said bypass flow control means for conjoint operation of the latter.

19. An aircraft as claimed in claim 3, in which said motors, said fluid stream creating means, said fluid flow producing means and said connecting means constitude a hydraulic driving and control unit which is self contained and independently transportable for mounting on a vehicle as a unit.

20. An aircraft as claimed in claim 19, including a respective mounting adapter connected to each motor, each motor being pivotally connected to its associated adapter for swinging into and out of said body.

21. An aircraft as claimed in claim 19, including a pair of hydraulic fluid flow producing means each having corresponding first outputs commonly connected to the motors on one side of said axis and corresponding second outputs commonly connected to the motors on the opposite side of said axis; and check valve means in the interconnections between said pair of fluid flow producing means preventing flow of fluid from an output of one fluid flow producing means to an output of the other fluid producing means in the event of failure of the other fluid flow producing means.

* * * * *